United States Patent
Hayashi et al.

(10) Patent No.: US 6,341,239 B1
(45) Date of Patent: Jan. 22, 2002

(54) ELECTRONIC CONTROL UNIT AND METHOD HAVING PROGRAM REWRITING FUNCTION

(75) Inventors: Shinnosuke Hayashi, Nukata-gun; Keiji Sugai, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/275,400

(22) Filed: Mar. 24, 1999

(30) Foreign Application Priority Data

Mar. 25, 1998 (JP) ............................................ 10-077577

(51) Int. Cl.7 ................................................. G05B 9/02
(52) U.S. Cl. ................................ 700/79; 713/2; 714/23
(58) Field of Search ................................. 700/1, 79–81, 700/87; 701/29, 115; 365/185.29, 185.33; 711/103; 713/2; 714/2, 7, 23, 55, 10

(56) References Cited

U.S. PATENT DOCUMENTS 5,432,927 A * 7/1995 Grote et al. .................... 713/2
5,802,485 A 9/1998 Koelle et al. ................. 701/29
5,826,205 A 10/1998 Koelle et al. ................. 701/29
5,828,977 A 10/1998 Hayashi et al. ............. 701/115

* cited by examiner

Primary Examiner—Willaim Grant
Assistant Examiner—Steven R. Garland
(74) Attorney, Agent, or Firm—Nixon & Vanderhye P.C.

(57) ABSTRACT

In an ECU for controlling an engine, a microcomputer executes a program in a mask ROM after releasing the reset, determines a signal of a specific input terminal, and switches in accordance with the foregoing determination result the self operation mode into either one of the normal mode to execute a control program in a flash ROM and the rewrite mode to update and write a data from an external unit into the ROM. A monitor circuit monitors a watchdog pulse from the microcomputer, outputs a reset pulse to the microcomputer when determining an abnormality, and alters the level of the foregoing signal to the microcomputer into the level of the normal mode into the level of the rewrite mode.

4 Claims, 4 Drawing Sheets

ELECTRONIC CONTROL UNIT AND METHOD HAVING PROGRAM REWRITING FUNCTION

CROSS REFERENCE TO RELATED APPLICATION

This application relates to and incorporates herein by reference Japanese Patent Application No. 10-77577 filed on Mar. 25, 1998.

BACKGROUND OF THE INVENTION

1. Field of the Invention

The present invention relates to an electronic control unit and method using a microcomputer, specifically to an electronic control unit and method in which a control program and control data used for the microcomputer performing a control process can be rewritten on board.

2. Related Art

As an electronic control unit to control, for example, a vehicle engine, there has been proposed the on-board rewritable type, which contains a microcomputer including a rewritable nonvolatile memory such as an EEPROM or a flash EEPROM storage contents of which can electrically be rewritten (specifically, erased and newly written), and enables a control program and control data stored in the rewritable nonvolatile memory to be rewritten in a state that the concerned unit is completely assembled.

In Japanese Patent Publication JP-A-9-44216 U.S. Pat. No. 5,828,977), an electronic control unit is designed to be connected to a memory rewrite unit not only through a communication line, but also through a mode determining control signal line. Immediately after a microcomputer of the electronic control unit starts its operation at the reset state, the microcomputer executes a starting program (boot program) in a non-rewrite-object nonvolatile memory, and thereby checks the state of a signal inputted from the memory rewrite unit through the mode determining control signal line. In accordance with the state of the signal, the microcomputer switches the self operation mode into either one of the normal mode that executes the control program in the rewritable nonvolatile memory and the rewrite mode that executes the rewrite process.

Therefore, after the electronic control unit is powered, if it is arranged to operate the microcomputer from the reset state, and to output a signal indicating the rewrite mode to the mode determining control signal line from the memory rewrite unit, the microcomputer will execute the rewrite process without relation to the control program in the rewritable nonvolatile memory. Accordingly, even when the control program is not yet written into the rewritable nonvolatile memory, or when the control program stored in the rewritable nonvolatile memory becomes abnormal by any cause, the data write (that is, a new data write, or rewrite) into the rewritable nonvolatile memory can be executed.

However, if the mode determining control signal line is provided between the electronic control unit and the memory rewrite unit, the following problems will occur.

① It is necessary to add a dedicated terminal for the mode determining control signal line to the connector that connects the electronic control unit and the memory rewrite unit. Although the mode determining control signal line is rarely used in practice, a new connector terminal has to be provided additionally.

② Maintenance shops of vehicles and the like have been using a trouble diagnostic service tool whereby self-diagnostics data stored in the electronic control unit can be read through the communication line. Accordingly, there arises a request from them such that the function of the memory rewrite unit is incorporated into the foregoing service tool, and thereby the control program and control data can be written by using the communication line only.

However, if the mode determining control signal line is provided, the foregoing request will not be satisfied, which lacks in flexibility. That is, a special one will be needed as the memory rewrite unit. In addition, the wire harness for connecting the memory rewrite unit and the wire harness for connecting the other service tools cannot be integrated into one.

③ In general, the connection of the electronic control unit and the memory rewrite unit of this type is made such that the connector provided on the end of the wire harness extended from the electronic control unit side is engaged in the connector of the memory rewrite unit side. However, if the mode determining control signal line inside the wire harness extended from the electronic control unit side is short-circuited to a part of the voltage level indicating the rewrite mode in a vehicle, the normal control program will not be executed.

Here, when writing the control program and the control data, for example, if the operator takes a procedure to open the cover of the electronic control unit, and to directly apply a mode determining signal to the input terminal (input port) of the microcomputer, it will be possible to dispense with the mode determining control signal line. However, from the workability and the reliability of the electronic control unit, this is not practicable.

SUMMARY OF THE INVENTION

The present invention has an object to provide an electronic control unit and method that can execute a data write into a rewritable nonvolatile memory without a signal line for determining the mode furnished between an external unit and the electronic control unit, even when a control program is not written into the rewritable nonvolatile memory, or when the control program stored in the rewritable nonvolatile memory becomes abnormal.

According to the present invention, a microcomputer is programmed to execute a control program composed of data stored in a rewritable nonvolatile memory, and executes a control process for controlling a control object. A monitor circuit monitors whether an execution state of the control program by the microcomputer is normal or not.

In this electronic control unit, specially, when the monitor circuit determines that the execution state of the control program is abnormal, the microcomputer executes a rewrite process for updating to write a rewrite data transmitted from an external unit into the rewritable nonvolatile memory.

Thus, in case the control program is not yet written into the rewritable nonvolatile memory, or in case the control program stored in the rewritable nonvolatile memory becomes abnormal by any cause, the microcomputer is not able to execute the control program normally. Therefore, in both of the foregoing cases, the monitor circuit determines the execution state by the microcomputer to be abnormal, and the microcomputer shifts the mode to the rewrite mode to execute the rewrite process.

Accordingly, although a signal line for determining the mode is not furnished between the external unit and the electronic control unit, it is possible to write a new control program and new control data into the rewritable nonvolatile memory from a state that the control program is not written into the rewritable nonvolatile memory. When the control program stored in the rewritable nonvolatile memory is brought into an abnormal state, it is possible to rewrite the concerned control program into a program of normal contents.

Here, as the rewritable nonvolatile memory, an EEPROM or flash EEPROM is generally used, however other rewritable ROMs may also be used.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

An exemplary embodiment of the invention will be described with reference to the accompanying drawings.

Figure 1:
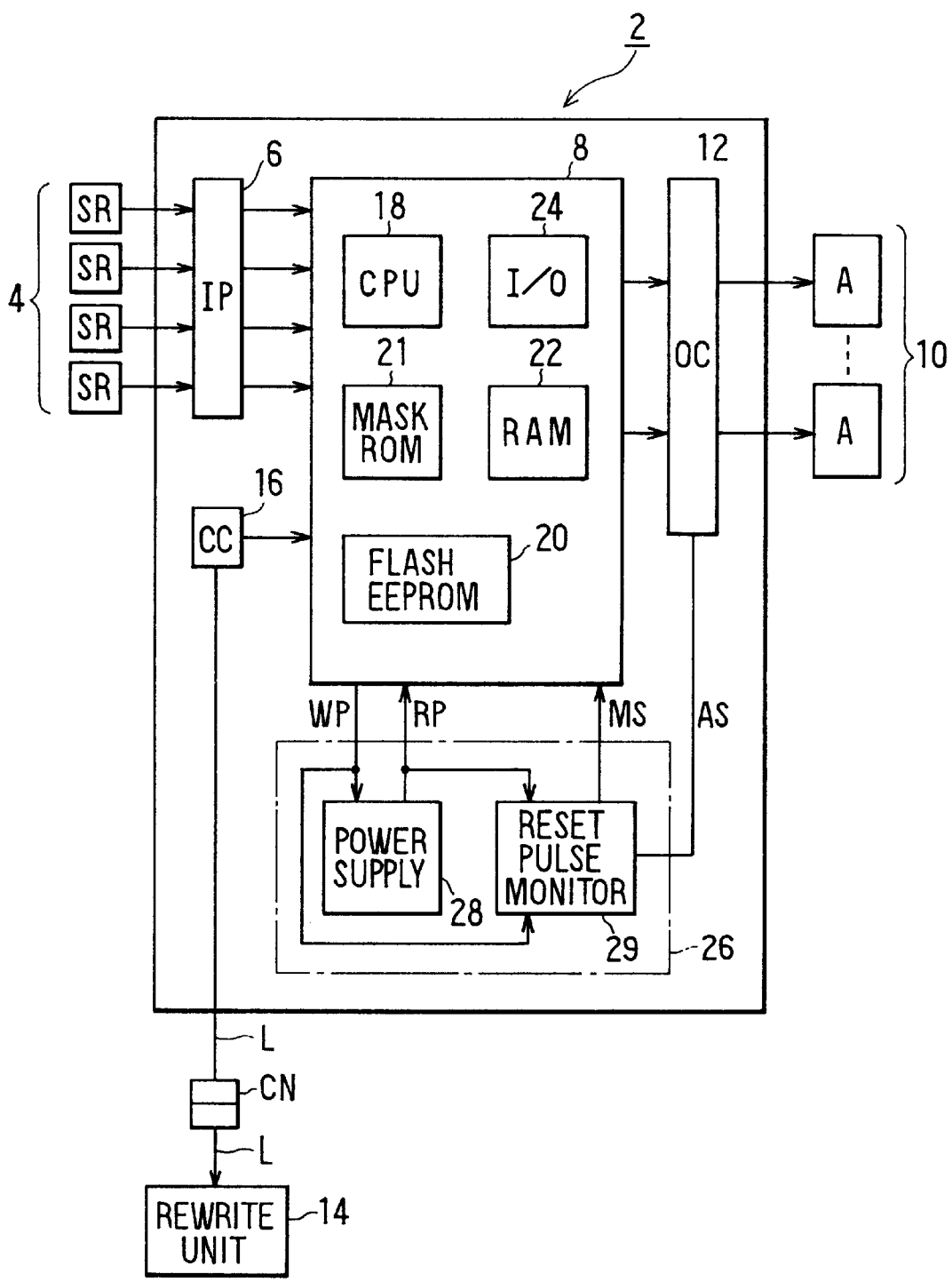
FIG. 1 is a block diagram illustrating a construction of an electronic control unit (ECU) of one embodiment.

In FIG. 1 illustrating an electronic control system for a vehicle internal combustion engine using an electronic control unit (ECU) 2, the ECU 2 comprises an input processing circuit (IP) 6 that inputs signals from various sensors (SR) 4 for detecting the running states of an engine and processes the sensor signals. The ECU 2 further comprises a microcomputer 8 that operates or calculates the optimum control values to the engine on the basis of the sensor signals from the input processing circuit 6 and outputs control signals on the basis of the operation results, an output circuit (OC) 12 that receives the control signals from the microcomputer 8 and drives actuators (A) 10 such as fuel injectors, igniter, and the like which are mounted on the engine. The ECU 2 further comprises a communication circuit (CC) 16 for executing a serial data communication with a memory rewrite unit 14, which is an external unit.

The microcomputer 8 includes a central processing unit (CPU) 18 that operates in accordance with a program, a nonvolatile flash EEPROM 20 and a mask ROM 21 that store a program (specifically, data constituting the program) required for operating the CPU 18 and data to be referred to during the execution of the program by the CPU 18, a volatile RAM 22 that temporarily stores the operation results by the CPU 18, etc., and an input/output circuit (I/O) 24. The I/O 24 receives the signals from the input processing circuit 6 and the communication circuit 16, etc., and outputs the control signals to the output circuit 12.

The flash EEPROM 20 is a nonvolatile ROM, the storage contents of which can electrically be rewritten (erased and newly written). The mask ROM 21 is a nonvolatile ROM, the storage contents of which cannot be rewritten. However, in case that a flash EEPROM or an EEPROM is used as a substitute of the mask ROM 21, the erasing and writing only need to be inhibited to the storage contents.

Here, the contents of memory areas of the flash EEPROM 20, mask ROM 21, and RAM 22 will be described with reference to FIG. 2.

Figure 2:
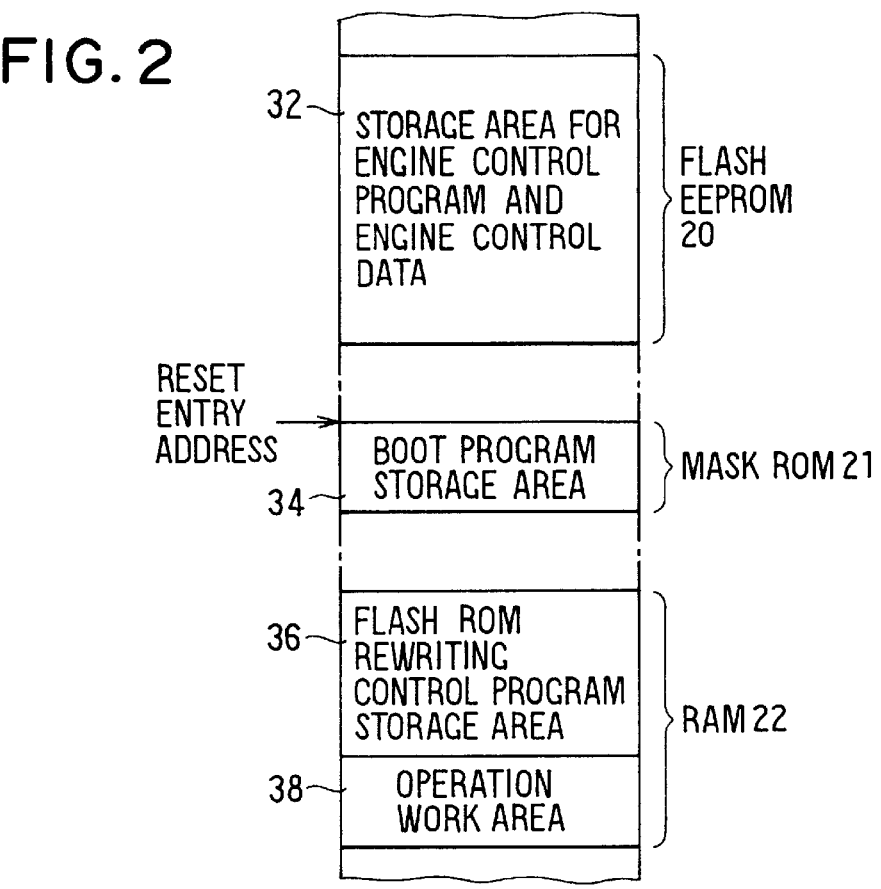
FIG. 2 is a view illustrating the contents of memory areas.

As shown in FIG. 2, the flash EEPROM 20 is used as an engine control program and data (program/data) storage area 32 for storing the control program and control data for an engine control. After the microcomputer 8 is mounted on the board of ECU 2 in the manufacturing process of ECU 2, applicable control program and control data are written in the flash EEPROM 20. Here, the control program and control data are assumed to have already been written therein.

On the other hand, the mask ROM 21 is used as a boot program storage area 34 for storing a boot program executed immediately after a reset releasing, and an applicable boot program is stored in advance in this mask ROM 21 before the microcomputer 8 is mounted on the board of ECU 2.

The RAM 22 is provided with a flash ROM rewriting control program storage area 36 and an operation work area 38. A flash ROM rewriting control program transmitted from the memory rewrite unit 14 described later is transferred to the flash ROM rewriting control program storage area 36 in order to rewrite the storage contents of the flash EEPROM 20. The operation work area 38 is used for an operation work when the flash ROM rewriting control program is executed.

Furthermore, each of the boot program in the mask ROM 21, the control program stored (written) in the flash EEPROM 20, and the flash ROM rewriting control program transmitted from the memory rewrite unit 14 to the flash ROM rewriting control program storage area 36 of the RAM 22 contains a watchdog pulse outputting program by which the microcomputer 8 outputs an operation monitoring watchdog pulse WP at each time equal to or less than a predetermined specific time TW.

Referring again to FIG. 1, the memory rewrite unit 14 is connected to ECU 2, when the control program and control data for the engine control are written afresh in the flash EEPROM 20, or the already written control program and control data are rewritten by new contents. The connection of ECU 2 and the memory rewrite unit 14 is made by engaging connectors CN of both, so that communication line L of both are connected in terms of signals. That is, to engage the connectors CN enables the microcomputer 8 of ECU 2 to conduct a serial communication with the memory rewrite unit 14 through the communication circuit 16 and the communication line L.

Further, ECU 2 comprises a monitor circuit 26 for monitoring the operation state of the microcomputer 8, and the monitor circuit 26 contains a power supply IC 28 with a watchdog pulse monitoring function and a reset pulse monitoring IC 29.

Here, the power supply IC 28 possesses the following three functions (1)–(3). (1) An operation voltage supply function that converts a power supply voltage (normally, about 12 volts from a battery, supplied through the ignition switch of a vehicle or the like) applied to ECU 2 into an operation voltage of 5 volts and supplies it to the microcomputer 8, output circuit 12, and the like inside ECU 2. (2) The power-on reset function that continues to supply a reset signal to a reset terminal of the microcomputer 8 for a period from when the supply of the operation voltage is started with the input of the power supply voltage until when the operation voltage is regarded to have reached a stabilized level. (3) The watchdog pulse monitoring function (the watchdog pulse timer function) that monitors the watchdog pulse to be outputted at each time equal to or less than the foregoing specific time TW accompanied with the program execution by the microcomputer 8, and outputs a reset pulse RP of a predetermined time width to the reset terminal of the microcomputer 8 when the output period is abnormal, that is, when the watchdog pulse WP is not outputted from the microcomputer 8 within a timer time TM that is set longer than the foregoing specific time TW.

Figure 5:
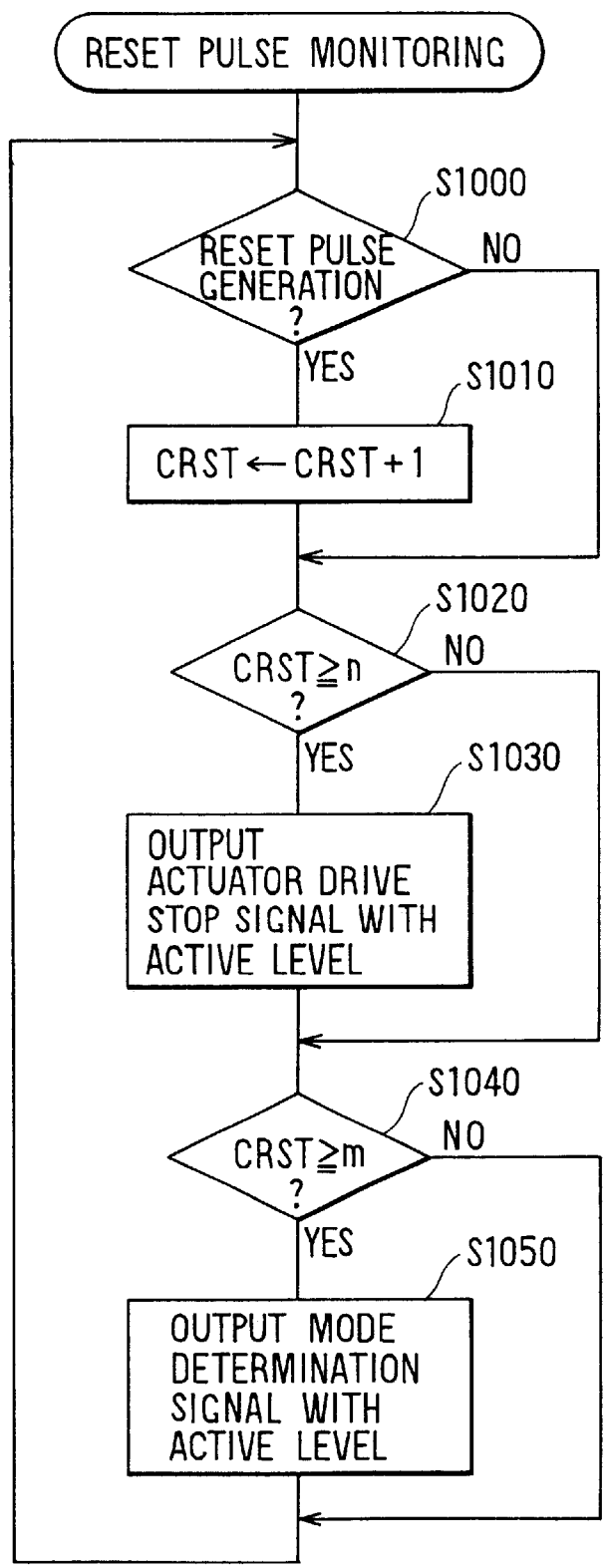
FIG. 5 is a flow diagram illustrating the process that a reset pulse monitoring IC constituting a monitor circuit executes.

The reset pulse monitoring IC 29 is formed of a small-scaled microcomputer (for example, one bit microcomputer) having a simplified construction, and executes the processing shown in FIG. 5 with the operation voltage supplied from the power supply IC 28.

That is, at step (S) S1000, whether the reset pulse RP is generated from the power supply IC 28 to the microcomputer 8 is determined, and if the reset pulse RP is determined to be not generated, the process is shifted to S1020. If the reset pulse RP is determined to be generated, a counter CRST for counting the number of the reset pulses being generated is incremented by 1 at the following S1010, and then the process advances to S1020.

At S1020, the value of the counter CRST is determined as to whether it is equal to or more than a predetermined value n larger than 1, and if the value of the counter CRST is determined to be equal to or more than the predetermined value n, an actuator drive stop signal AS with the active level (for example, low level=0 volt) is outputted to the output circuit 12 at the following S1030. Receiving the stop signal AS, the output circuit 12 stops driving the actuator 10 regardless of the control signal from the microcomputer 8.

In other words, directly after receiving the operation voltage from the power supply IC 28 and starting the operation, the reset pulse monitoring IC 29 has started to output the actuator drive stop signal AS with the passive level (for example, high level=5 volts) to the output circuit 12. In this state, the drive of the actuator 10 by the output circuit 12 is possible. When the reset pulse RP is outputted repeatedly (n >1) to the microcomputer 8 from the power supply IC 28 and the value of the counter CRST becomes equal to or more than the predetermined value n, the reset pulse monitoring IC 29 determines the operation of the microcomputer 8 to be abnormal, and alters the level of the actuator drive stop signal AS to the output circuit 12 into the active level. Thereby, the drive of the actuator 10 by the output circuit 12 is forcibly stopped. Here, this forcible stop state continues until the power supply to ECU 2 is cut off.

Next, when the actuator drive stop signal AS is brought into the active level at the foregoing S1030, or when the value of the counter CRST is determined to be less than the predetermined value n at the foregoing S1020, the process is shifted to S1040, where the value of the counter CRST is determined as to whether it is equal to or more than a predetermined value m larger than 1.

If the value of the counter CRST is not equal to or more than the predetermined value m, the process returns to S1000. However, if the value of the counter CRST is equal to or more than the predetermined value m, the reset pulse monitoring IC 29 outputs a mode determining control signal MS with the active level (for example, low level=0 V) corresponding to a rewrite mode to a specific input terminal (mode determining input terminal) of the microcomputer 8. Then, the process returns to S1000.

As described above, immediately after receiving the operation voltage from the power supply IC 28 and starting the operation, the reset pulse monitoring IC 29 starts to output the mode determining control signal MS with the passive level (for example, high level=5 V) corresponding to a normal mode to the foregoing mode determining input terminal of the microcomputer 8. When the reset pulse RP is outputted for m times to the microcomputer 8 from the power supply IC 28 and the value of the counter CRST becomes equal to or more than the predetermined value m, the reset pulse monitoring IC 29 determines the operation of the microcomputer 8 to be abnormal, and alters the level of the mode determining control signal MS to the foregoing mode determining input terminal into the active level corresponding to the rewrite mode. Here, this state continues until the power supply to ECU 2 is cut off.

In ECU 2 thus constructed, the microcomputer 8 starts the operation from the reset state, and executes the boot program in the mask ROM 21 that is set as a reset entry address as shown in FIG. 2, whereby the microcomputer 8 determines the level of the mode determining control signal MS inputted to the foregoing mode determining input terminal. In accordance with the level of the mode determining control signal MS at that time, the microcomputer 8 switches the operation mode thereafter into either one of the normal mode that executes the control program in the flash EEPROM 20 and the rewrite mode that executes a rewrite processing for updating to write in the flash EEPROM 20 rewrite data (that is, new control program and control data) transmitted from the memory rewrite unit 14.

Figure 3:
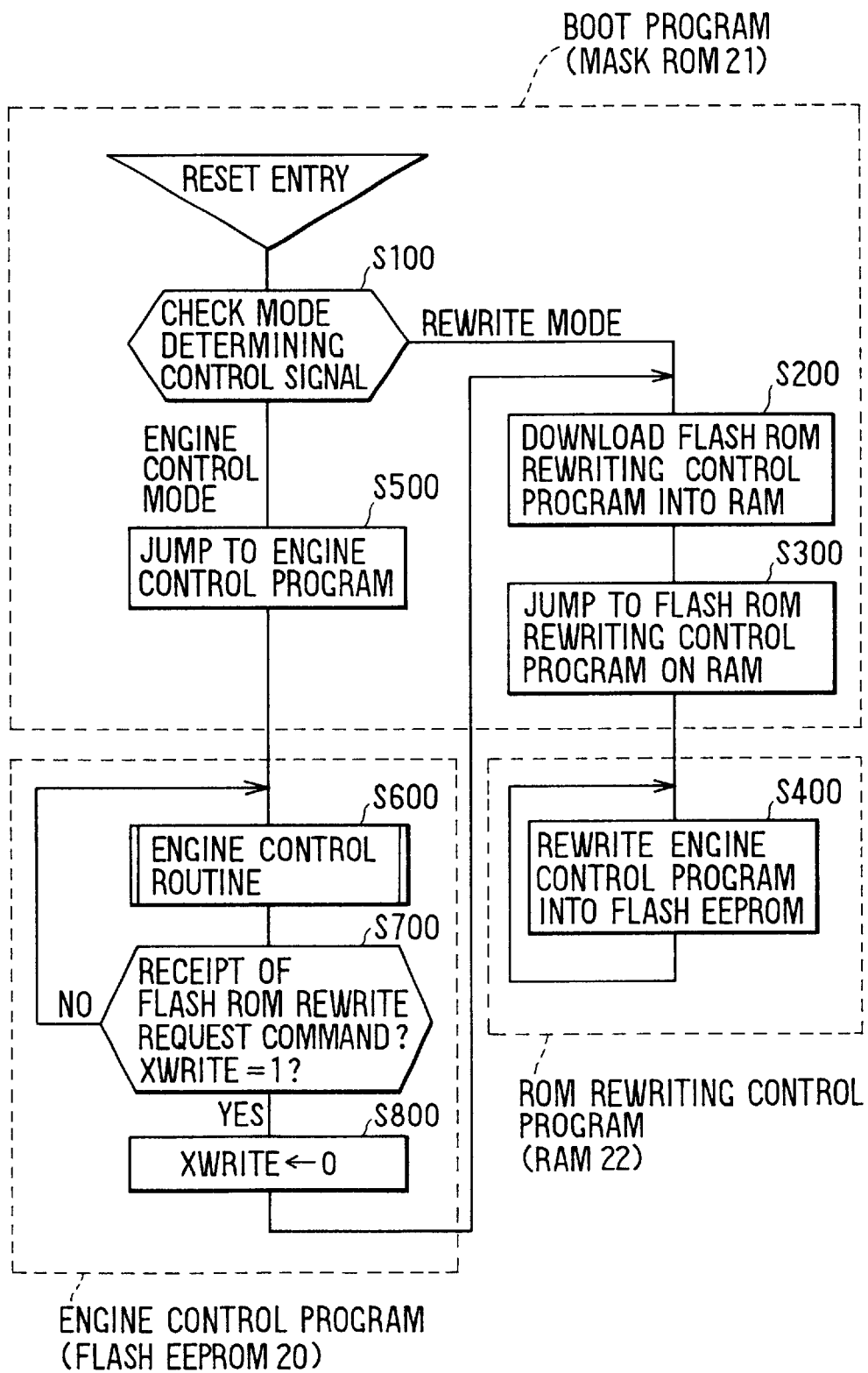
FIG. 3 is a flow diagram illustrating the total process that a microcomputer of ECU executes.

Next, the process executed by the microcomputer 8 will now be described with reference to FIG. 3. Here, FIG. 3 is a flow diagram illustrating the total process executed by the microcomputer 8, in which the processes of S100~S300, and S500 are executed by the boot program in the mask ROM 21. The process of S400 is executed by the flash ROM rewriting control program that the memory rewrite unit 14 transmits to the RAM 22. The processes of S600~S800 are executed by a control program for an engine control (engine control program) in the flash EEPROM 20.

As shown in FIG. 3, starting the operation at the reset state, first the microcomputer 8 starts executing the boot program in the mask ROM 21.

First at S100, the microcomputer 8 checks the level of the mode determining control signal inputted to its own mode determining input terminal from the reset pulse monitoring IC 29 of the monitor circuit 26.

If the mode determining control signal is active, the microcomputer 8 determines it to be the rewrite mode, and advances the process to S200. At this S200, the flash ROM rewriting control program is downloaded into the RAM 22 from the memory rewrite unit 14.

That is, after the specific operation is finished, the memory rewrite unit 14 is designed to read out the flash ROM rewriting control program from the concerned storage media such as a ROM or a magnetic disk set on the memory rewrite unit 14 and to transmit the program to ECU 2 through the communication line L. Then, by the process of S200, the microcomputer 8 receives the flash ROM rewriting control program from the memory rewrite unit 14, and stores the program on the flash ROM rewriting control program storage area 36 on the RAM 22.

After downloading of the flash ROM rewriting control program on the RAM 22 is completed by the process of S200, the process advances to S300, and jumps to the process start address of the flash ROM rewriting control program storage area 36 on the RAM 22. The flash ROM rewriting control program is executed on the RAM 22. As shown in S400, the rewrite process for updating to write the write data transmitted from the memory rewrite unit 14 into the flash EEPROM 20 is executed.

Further, the rewrite process of the flash ROM rewriting control program is executed, for example, by the following procedure.

1. Read in an object address (or, erase object block) for writing data from the memory rewrite unit 14 through the communication line L, and erase old data from the object address (or, erase object block) in the flash EEPROM 20.

2. Read in write data (that is, new data constituting a new control program and new control data) from the memory rewrite unit 14 through the communication line L, and write the data in the area on the flash EEPROM 20 where the old data are erased.

3. Receive all the control programs and control data that should be rewritten from the memory rewrite unit 14, output a rewrite completion signal to the memory rewrite unit 14 through the communication line L after completing to rewrite the flash EEPROM 20, and thereafter repeat to output this rewrite completion signal, entering into an infinite loop.

Then, the memory rewrite unit 14 receives the foregoing rewrite completion signal, and displays a message of the rewrite complete on a specific display (not illustrated). Accordingly, the operator watches the message of the rewrite completion, and thereby recognizes that the data rewrite in the flash EEPROM 20 is completed.

On the other hand, if the mode determining control signal is determined as passive at S100 of the boot program, the microcomputer 8 determines it to be an engine control mode as the normal mode to advance the process to S500. At this S500, the process jumps to the engine control program in the flash EEPROM 20.

Thereafter, the engine control program in the flash EEPROM 20 is executed, and the processes of S600~S800 are executed.

That is, first at S600, an engine control routine as the control process for controlling an engine is executed. Further, this engine control routine is executed in accordance with a procedure such that an optimum fuel consumption, ignition timing, and the like of the engine are calculated on the basis of the various sensor signals from the input processing circuit 6 and the control data in the flash EEPROM 20, and in accordance with the calculation results, the control signals for driving the actuators 10 of a fuel injector, igniter, and the like are outputted.

While this engine control routine is repetitively executed, the engine is driven in electronically-controlled manner. However, after the execution of the engine control routine is completed in an ordinary manner, before the same routine is repeated again, at the following S700, whether a flash ROM rewrite request command from the memory rewrite unit 14 is received or not is determined on the basis of the status of a flash ROM rewrite request flag XWRITE.

This flash ROM rewrite request flag XWRITE is set in the process of an SCI interrupt that executes interruptions, when the serial data are received from the memory rewrite unit 14 through the communication line L.

Figure 4:
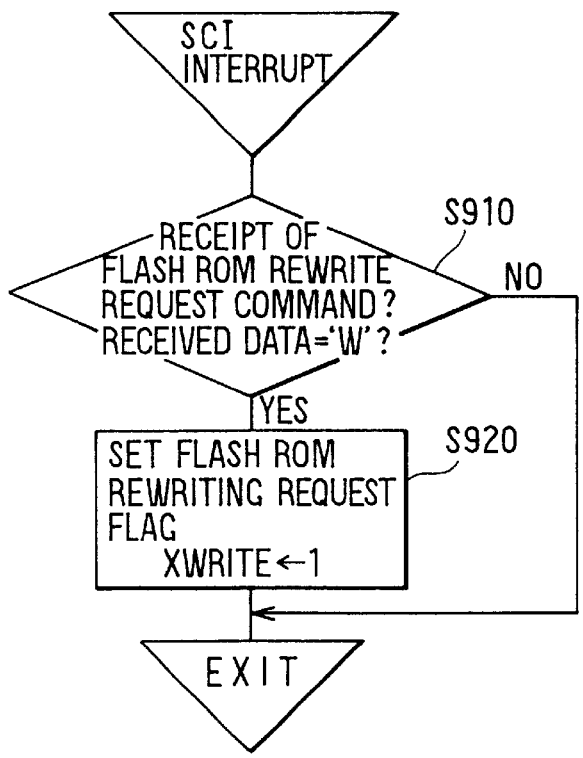
FIG. 4 is a flow diagram illustrating an SCI interrupt process that the microcomputer of ECU executes in the normal mode.

That is, receiving the serial data from the memory rewrite unit 14 while executing the engine control program, the microcomputer 8 executes the SCI interrupt process as shown in FIG. 4. First at S910, the microcomputer 8 determines whether the flash ROM rewrite request command 'W' as a rewrite instruction is received from the memory rewrite unit 14. If it is the flash ROM rewrite request command 'W', at the following S920, the flash ROM rewrite request flag XWRITE is set, and then the concerned SCI interrupt process is ended. If it is not the flash ROM rewrite request command, the concerned SCI interrupt process is ended. Here, the program of this SCI interrupt process is included in the engine control program in the flash EEPROM 20.

Therefore, each time the engine control routine (S600) is repeated, the set status of the flash ROM rewrite request flag XWRITE is checked (S700). If the flag XWRITE is not set, immediately the engine control routine (S600) is repeated.

On the other hand, at the foregoing S700, if the flash ROM rewrite request flag XWRITE is determined to be set, that is, when the flash ROM rewrite request command is received, the rewrite condition is determined to be complete, and the process advances to the following S800 without repeating the engine control routine. At this S800, the flash ROM rewrite request flag XWRITE is reset, and then the process moves to S200 of the foregoing boot program.

Therefore, if it also receives the flash ROM rewrite request command from the memory rewrite unit 14 while executing the engine control program, the microcomputer 8 will shift the self operation mode to the rewrite mode. The flash ROM rewriting control program from the memory rewrite unit 14 is executed on the RAM 22 by the foregoing processes S200~S400, and thereafter, the rewrite process that updates to write the write data transmitted from the memory rewrite unit 14 in the flash EEPROM 20 is executed.

In this case, when the program part of S700 and S800 is rewritten into the same content or an improved content, the function to transfer the engine control state to the rewrite mode is maintained. It may be arranged that the program part of S700 and S800 is not rewritten, and only the program part of the engine control routine of S600 is rewritten.

In ECU 2 of this embodiment as above, when the power supply voltage is applied thereto, by the power-on reset function of the power supply IC 28 constituting the monitor circuit 26, the microcomputer 8 starts the operation from the reset state, executes the boot program in the mask ROM 21 first, and at S100, determines that the mode is the engine control mode as the normal mode. This results from, as described above, that immediately after receiving the operation voltage from the power supply IC 28 and starting the operation, the reset pulse monitoring IC 29 outputs the mode determining control signal MS with the passive level corresponding to the normal mode to the mode determining input terminal of the microcomputer 8.

The microcomputer 8 transfers the process from the boot program to the engine control program in the flash EEPROM 20 (S500), and repeatedly executes the engine control routine (S600) on the basis of the engine control program to thereby control the engine. While it executes the engine control routine repeatedly, the microcomputer 8 periodically executes the watchdog pulse outputting program contained in the engine control program, and outputs the operation monitoring watchdog pulse WP at each time equal to or less than the specific time TW to the monitor circuit 26.

Here, in case that the control content of the engine is modified, in the state that the microcomputer 8 repeatedly executes the engine control routine as above, it is sufficient to arrange that the memory rewrite unit 14 is connected to the concerned ECU 2 and the flash ROM rewrite request command is transmitted to ECU 2 from the memory rewrite unit 14.

In other words, at S700 of the engine control program, when it determines to be in receipt of the flash ROM rewrite request command from the memory rewrite unit 14, the microcomputer 8 determines that the rewrite condition is established, and transfers the self operation mode to the rewrite mode.

In this rewrite mode, the microcomputer 8 downloads the flash ROM rewriting control program from the memory rewrite unit 14 on the RAM 22 (S200) based on a specific handshake with the memory rewrite unit 14, and transfers the process to the execution process of the flash ROM rewriting control program (S300), whereby the microcomputer 8 will execute the rewrite process (S400) for updating to write in the flash EEPROM 20 the rewrite data (new engine control program and new control data) transmitted from the memory rewrite unit 14.

Thereafter, completing the rewrite process of the flash EEPROM 20, the microcomputer 8 transmits the rewrite completion signal to the memory rewrite unit 14, so that the memory rewrite unit 14 has a message of the rewrite completion displayed on the display thereof.

Accordingly, after confirming that the message of the rewrite completion is displayed, it is only needed that the operator cuts off the supply of the power supply voltage, removes the memory rewrite unit 14 from the communication line L, and applies the power supply voltage to ECU 2 again.

As described above, the microcomputer 8 determines the mode as the normal mode (engine control mode) at S100 of the boot program, and executes the engine control program in the flash EEPROM 20. However at this moment, the engine control program and the control data in the flash EEPROM 20 are rewritten into new contents. Accordingly, an engine control of the different contents from the one before rewritten is carried out in the engine control routine executed at S600.

When the microcomputer 8 is in the midst of executing the rewrite process of S400, for example, if the supply of the power supply voltage to ECU 2 is cut off, or if the connection between ECU 2 and the memory rewrite unit 14 is broken off, the rewrite process is suspended, so that the microcomputer 8 is brought into a state such that the engine control program in the flash EEPROM 20 cannot be executed normally.

In case that the data write into the flash EEPROM 20 results in a failure as above, it is necessary to write and correct the storage content of the flash EEPROM 20. However, once the engine control program in the flash EEPROM 20 falls into a state being abnormal, the microcomputer 8 is not able to determine the completeness/incompleteness of the rewrite condition by S700 in FIG. 3. Therefore, even though the memory rewrite unit 14 transmits the flash ROM rewrite request command to ECU 2, the microcomputer 8 becomes unable to shift the operation mode from the engine control mode to the rewrite mode.

Similarly, in the manufacturing process of ECU 2, etc., also in the initial state such that the control program and the control data are not yet written in the flash EEPROM 20, the microcomputer 8 is not able to determine the completeness/incompleteness of the rewrite condition by S700 in FIG. 3. Therefore, even though the memory rewrite unit 14 is connected to ECU 2 and the flash ROM rewrite request command is transmitted to ECU 2 from the memory rewrite unit 14, the operation mode of the microcomputer 8 cannot be shifted to the rewrite mode.

However, according to ECU 2 of this embodiment, even in case the control program in the flash EEPROM 20 becomes abnormal by any cause, or even in case the control program is not yet written into the flash EEPROM 20, the operation described hereafter makes it possible not only to bring the operation mode of the microcomputer 8 into the rewrite mode, but also to execute the data write (specifically, rewrite or new write of the control program, etc.) into the flash EEPROM 20.

That is, in case the control program stored in the flash EEPROM 20 is in an abnormal state by any cause, or in case the control program is not yet written into the flash EEPROM 20, if the power supply voltage is applied to ECU 2 to operate the microcomputer 8 from the reset state, the microcomputer 8 will shift the operation to the execution of the control program (S600) in the flash EEPROM 20 from S500 of the boot program. However in this case, the microcomputer 8 is not able to execute the control program normally, and in consequence, the microcomputer 8 will not be able to output the watchdog pulse WP that should be outputted at each time equal to or less than the specific time TW.

The power supply IC 28 of the monitor circuit 26 determines that the execution state of the control program by the microcomputer 8 is abnormal, and outputs the reset pulse RP to the reset terminal of the microcomputer 8. Accordingly, the microcomputer 8 will start the operation again from the reset state, and shift the operation from S500 of the boot program to the execution of the control program (S600) in the flash EEPROM 20.

Here, in case the control program stored in the flash EEPROM 20 is in an abnormal state, or in case the control program is not written into the flash EEPROM 20, even though the reset pulse RP is supplied to the microcomputer 8, the control program is not executed normally, and the watchdog pulse WP is not outputted at each time equal to or less than the specific time TW from the microcomputer 8.

Therefore, the state continues in which the reset pulse RP is outputted from the power supply IC 28 to the microcomputer 8, in which the execution state of the control program by the microcomputer 8 does not become normal, even though the reset pulse RP is outputted to the microcomputer 8.

When the m-th reset pulse RP (m>1) is outputted to the microcomputer 8 from the power supply IC 28, by the processes of S1040 and S1050 in FIG. 5, the reset pulse monitoring IC 29 of the monitor circuit 26 alters the level of the mode determining control signal MS that the reset pulse monitoring IC 29 outputs to the mode determining input terminal of the microcomputer 8 from the passive level into the active level corresponding to the rewrite mode.

Then, the microcomputer 8 will start the operation again from the reset state by the foregoing m-th reset pulse RP. In this case, the mode determining control signal MS inputted to the mode determining input terminal of the microcomputer 8 from the reset pulse monitoring IC 29 is in the active level corresponding to the rewrite mode. Accordingly, the microcomputer 8 determines the mode as the rewrite mode by S100 of the boot program, and executes the processes of S200~S400, regardless of the storage contents of the flash EEPROM 20.

Therefore in this state, connecting the memory rewrite unit 14 to ECU 2, and sequentially transmitting from the memory rewrite unit 14 to ECU 2 the flash ROM rewriting control program, the object address for writing the data, and the write data to be written will make it possible to write a desired control program and control data into the flash EEPROM 20.

Thus, in ECU 2 of this embodiment, in case that the execution state of the control program by the microcomputer 8 is determined to be abnormal by the monitor circuit 26, the microcomputer 8 transfers the mode to the rewrite mode to execute the rewrite process (S400). Therefore, without a special mode determining signal line provided between the microcomputer 8 and the memory rewrite unit 14, in case the control program stored in the flash EEPROM 20 has been brought into an abnormal state, or in case the control program is not written into the flash EEPROM 20, the microcomputer 8 is able to write the data into the flash EEPROM 20.

That is, if there is not a special mode determining signal line provided between the microcomputer 8 and the memory rewrite unit 14, in case the control program written in the flash EEPROM 20 has been brought into an abnormal state, the microcomputer 8 is able to write and correct the concerned control program into a normal content. From the state in which the control program is not written into the flash EEPROM 20, the microcomputer 8 is able to write a new control program and control data into the flash EEPROM 20.

Therefore, according to ECU 2 of this embodiment, ECU 2 can be connected to the memory rewrite unit 14 through only the communication line L, and is able to solve all the conventional problems.

Moreover, in ECU 2 of this embodiment, the reset pulse monitoring IC 29 constituting the monitor circuit 26 counts the output frequency of the reset pulse RP outputted to the microcomputer 8 from the power supply IC 28 constituting the monitor circuit 26 alike, and when the m-th (m>1) reset pulse RP is outputted to the microcomputer 8, the reset pulse monitoring IC 29 is arranged to alter the level of the mode determining control signal MS supplied to the mode determining input terminal of the microcomputer 8 into the active level corresponding to the rewrite mode. Accordingly, although the reset pulse RP is outputted to the reset terminal of the microcomputer 8, only when the state in which the execution state of the control program does not become normal continues for m-times, the monitor circuit 26 will output the mode determining control signal MS with the active level corresponding to the rewrite mode to the mode determining input terminal of the microcomputer 8.

Therefore, according to ECU 2 of this embodiment, when a normal returnable improper program execution occurs by the reset pulse RP in the midst that the microcomputer 8 executes a normal control program in the flash EEPROM 20, the execution state of the control program by the microcomputer 8 can swiftly be restored to the normal state only by the reset pulse RP from the power supply IC 28, without shifting the operation mode of the microcomputer 8 to the rewrite mode.

That is, the case in which a normal returnable improper program execution occurs in the microcomputer 8 is distinguished from the case in which a data write into the flash EEPROM 20 is necessary (that is, the case in which the control program is not written into the flash EEPROM 20, or the case in which the control program stored in the flash EEPROM 20 becomes abnormal by any cause), and only when a data write into the flash EEPROM 20 is definitely necessary, the operation mode of the microcomputer 8 can be shifted to the rewrite mode.

If the normal return from a improper program execution is not needed to be considered, the specific value m that the reset pulse monitoring IC 29 determines at S1040 in FIG. 5 can be set to "1". If this is arranged and the monitor circuit 26 determines the execution state of the control program by the microcomputer 8 as being abnormal, the monitor circuit 26 will always output the reset pulse RP to the reset terminal of the microcomputer 8, and output the mode determining control signal MS with the active level corresponding to the rewrite mode to the mode determining input terminal of the microcomputer 8.

Furthermore, according to ECU 2 of this embodiment, the microcomputer 8 determines to shift the operation mode to either one of the rewrite mode and the normal mode, by only determining the signal level of the mode determining input terminal in the boot program executed directly after releasing the reset. Therefore, the microcomputer 8 is not necessary to remain in the boot program for a long time, and the microcomputer 8 is able to reduce to a minimum a delay time before the start of executing the control program in the normal state that the data write into the flash EEPROM 20 is not executed. Since the boot program can be made up with a simple construction, a small capacity memory can be used as the mask ROM 21 to store the boot program.

The invention is not limited to the foregoing embodiment, and naturally various modifications and changes can be made to the embodiment.

For example, it may be so arranged that, when the generation period of the reset pulse RP is shorter than a predetermined time, and in addition, the generation frequency reaches the specific value m (>1), the level of the mode determining control signal MS to the microcomputer 8 is altered from the passive level into the active level.

In this instance, the case in which a normal returnable improper program execution occurs in the microcomputer 8 can be distinguished more reliably from the case in which the control program is not written into the flash EEPROM 20, or the case in which the control program stored in the flash EEPROM 20 becomes abnormal.

Further, the reset pulse monitoring IC 29 may be constructed such that the execution state of the control program by the microcomputer 8 is determined as being normal or not, by monitoring the output period of the watchdog pulse WP. That is, the reason is that after a specific timer time TM counted by the power supply IC 28 has passed, if the watchdog pulse WP is not outputted from the microcomputer 8, the operation state of the microcomputer 8 can be determined as not having returned to the normal state although the microcomputer 8 has received the reset pulse RP from the power supply IC 28 for plural times.

On the other hand, it may be arranged to make the reset pulse monitoring IC 29 bear the watchdog pulse monitoring function (watchdog timer function) that the power supply IC 28 holds, and to output the reset pulse RP from the reset pulse monitoring IC 29 thus arranged to the microcomputer 8.

Further, the monitor circuit 26 may be made up with one IC in stead of the two separate ICs 28 and 29.

Here, regardless of what the control program in the flash EEPROM 20 is abnormal in itself, there is also a possibility that successfully carries out the program part to output the watchdog pulse WP. Accordingly, it may be arranged, for example, that before starting to execute the control program in the flash EEPROM 20 (before jumping to the control program at S500 in FIG. 3), the microcomputer 8 executes a sum check as to the data in the flash EEPROM 20, and in case of the sum check being abnormal, stops to output the watchdog pulse WP thereafter. This arrangement will detect more accurately that the control program in the flash EEPROM 20 is abnormal, so that the operation mode can be shifted to the rewrite mode, where the control program can be rewritten.

On the other hand, in ECU 2 of the foregoing embodiment, the flash ROM rewriting control program is designed to be received from the memory rewrite unit 14. However, it may be arranged to store the flash ROM rewriting control program in advance in a non-rewrite-object nonvolatile memory (for example, the mask ROM 21).

Further, in ECU 2 of the foregoing embodiment, the flash EEPROM 20 is employed as the rewritable nonvolatile memory; however, the other ROMs that are electrically rewritable, such as EEPROM, may be employed.

Furthermore, ECU 2 of the foregoing embodiment is intended to control the engine of a vehicle. However, the invention can be applied in the entirely same manner to the electronic control unit that controls the other control objects, for example, the brake, transmission, suspension, and the like.

What is claimed is:

1. An electronic control unit connectable to an external unit, comprising:

a microcomputer that executes a control program composed of data stored in a rewritable nonvolatile memory storage contents of which can electrically be rewritten, and executes a control process for controlling a control object; and monitor circuit that monitors whether an execution state of the control program by the microcomputer is normal or abnormal, wherein the microcomputer is constructed to execute a rewrite process for updating to write a rewrite data transmitted from the external unit into the rewritable nonvolatile memory, when the execution state of the control program is determined to be abnormal by the monitor circuit;

the microcomputer is constructed to execute, immediately after starting an operation from a reset state, a starting program stored in a non-rewrite-object nonvolatile memory thereby determining a level of a mode determining binary signal inputted to a self specific input terminal, and in accordance with the level of the mode determining binary signal, switch a self operation mode into either one of a normal mode to execute the control program stored in the rewritable nonvolatile memory and a rewrite mode to execute the rewrite process; and the monitor circuit is constructed to output a reset pulse for resetting the microcomputer to a reset terminal of the microcomputer, and outputs the mode determining binary signal of a level corresponding to the rewrite mode to the specific input terminal of the microcomputer, when determining the execution state of the control program by the microcomputer as being abnormal.

2. An electronic control unit according to claim 1, wherein:

the monitor circuit is constructed to output the mode determining binary signal of a level corresponding to the rewrite mode to the specific input terminal of the microcomputer, only when a state in which the execution state of the control program by the microcomputer is abnormal continues for a plurality of times under a condition that the monitor circuit outputs the reset pulse.

3. An electronic control unit according to claim 1, wherein:

the microcomputer is constructed to determine whether a predetermined rewrite condition is satisfied or not when executing the control program in the rewritable nonvolatile memory, and to shift the self operation mode to the rewrite mode to execute the rewrite process when determining that the rewrite condition is satisfied.

4. An electronic control method for a microcomputer having a CPU for executing a first control program, a nonvolatile rewritable memory storing the control program and a monitor circuit, the microcomputer being connectable to an external rewrite unit for transmitting a second control program, the method comprising the steps of:

monitoring, by the monitor circuit, a first control program execution process of the microcomputer;

applying a monitor signal indicative of a monitoring result from the monitor circuit to the microcomputer;

transmitting the second control program from the external rewrite unit to the microcomputer; and rewriting the transmitted second control program into the nonvolatile rewritable memory in place of the first control program under a condition that the monitor signal is indicative of abnormality of the microcomputer;

executing, immediately after starting an operation from a reset state, a starting program stored in a non-rewrite-object nonvolatile memory thereby determining a level of a mode determining binary signal inputted to a self specific input terminal, and in accordance with the level of the mode determining binary signal, switching a self operation mode into either one of a normal mode to execute the control program stored in the rewritable nonvolatile memory and a rewrite mode to execute the rewrite process; and outputting from the monitor circuit a reset pulse for resetting the microcomputer to a reset terminal of the microcomputer, and outputting the mode determining binary signal of a level corresponding to the rewrite mode to the specific input terminal of the microcomputer, when determining the execution state of the control program by the microcomputer as being abnormal.

* * * * *